United States Patent [19]

Brandl

[11] 4,438,523
[45] Mar. 20, 1984

[54] DIFFERENTIAL DIGITAL MODULATION AND DEMODULATION SYSTEM WITH AN ANALOG SIGNAL-DEPENDENT SAMPLING CLOCK

[75] Inventor: Hans Brandl, Munich, Fed. Rep. of Germany

[73] Assignee: Siemens Aktiengesellschaft, Berlin & Munich, Fed. Rep. of Germany

[21] Appl. No.: 319,794

[22] Filed: Nov. 9, 1981

[30] Foreign Application Priority Data

Nov. 27, 1980 [DE] Fed. Rep. of Germany ....... 3044765

[51] Int. Cl.³ .............................................. H04B 12/04
[52] U.S. Cl. ......................................... 375/30; 371/37; 375/32
[58] Field of Search ................. 340/347 AD, 347 SH; 179/15.55 R; 358/13, 133, 137, 260; 375/28, 30, 31, 32, 33; 371/37, 42

[56] References Cited

U.S. PATENT DOCUMENTS

| | | | |
|---|---|---|---|
| 3,215,773 | 11/1965 | Chatten et al. | 358/137 |
| 4,037,226 | 7/1977 | Betts et al. | 340/347 DD |
| 4,053,712 | 10/1977 | Reindl | 179/15.55 T |
| 4,090,136 | 5/1978 | Magnien et al. | 375/30 |

FOREIGN PATENT DOCUMENTS 2815790 11/1978 Fed. Rep. of Germany .

OTHER PUBLICATIONS

IBM Technical Disclosure Bulletin vol. 15 No. 10 Mar. 1973 pp. 3168–3169, "Adaptive Delta Modulator with Variable-Sample Rate."

Article entitled: "Chip Delta Modulators Revive Designers' Interest," R. Steele, Electronics, Oct. 13, 1977 pp. 86–93.

Article entitled: "Asynchronous Delta-Modulation System," H. Inose et al., Electronics and Communications in Japan, vol. 49 1966, pp. 34–42.

Primary Examiner—Benedict V. Safourek
Attorney, Agent, or Firm—Hill, Van Santen, Steadman & Simpson

[57] ABSTRACT

A differential digital modulation and demodulation system with an analog signal-dependent sampling clock has a sampling clock-controlled first digital modulator and a predictably functioning second digital modulator, an analog signal to be converted to a digital signal being supplied to both modulators. A control signal for the sampling clock generator for the first digital modulator is generated from a tracking error signal of the second digital modulator, so that the clock frequency of the first digital modulator is increased upon an increasing tracking error and is decreased upon a decreasing tracking error. For digital signal transmission or storage, the digital signal bits are emitted by the modulator and received by the demodulator in the form of signal blocks which include a bit group indicating the respective sampling clock frequency in encoded form. Only one signal block indicating the pause length in encoded form is emitted or received for a particular analog signal pause.

18 Claims, 3 Drawing Figures

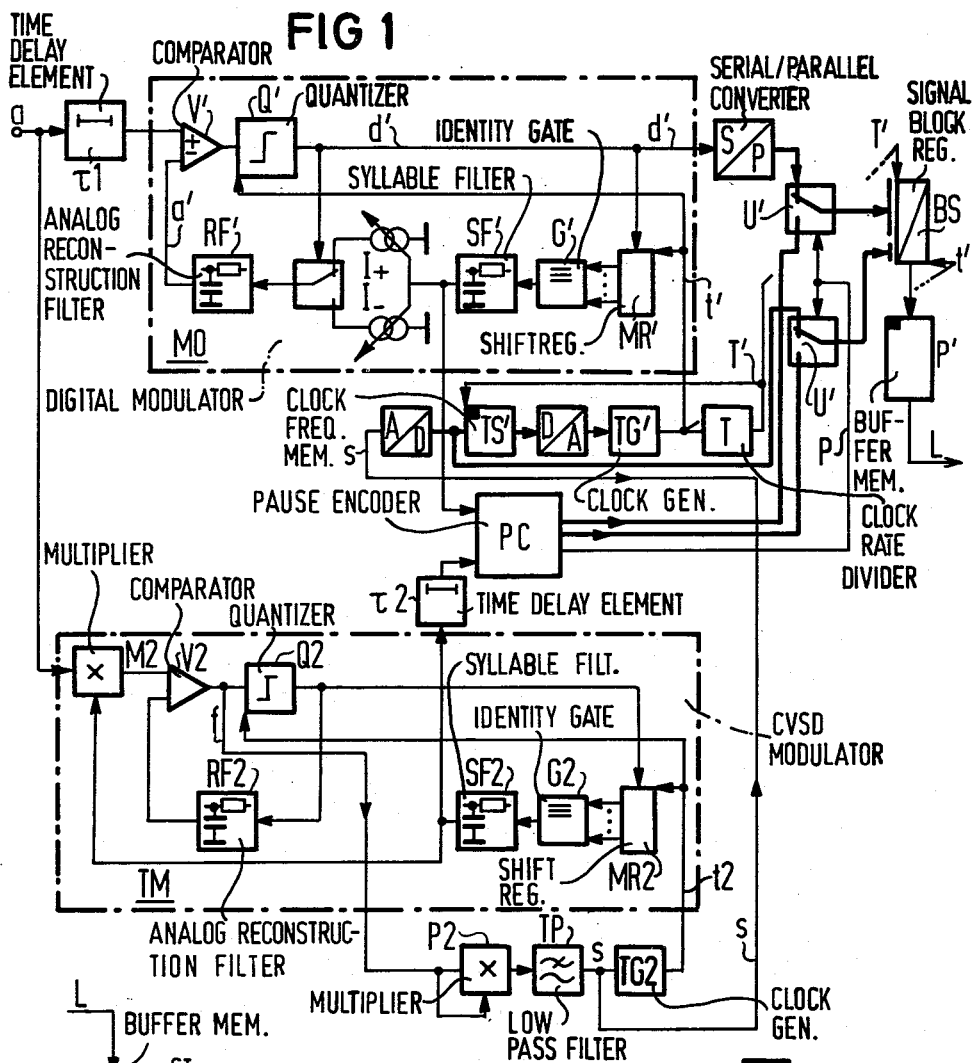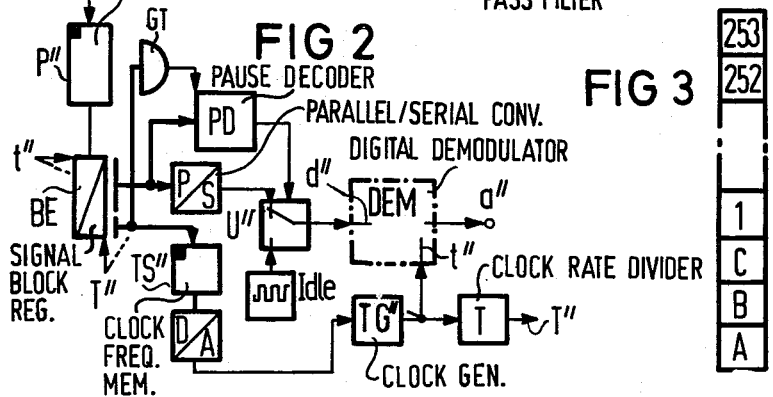

DIFFERENTIAL DIGITAL MODULATION AND DEMODULATION SYSTEM WITH AN ANALOG SIGNAL-DEPENDENT SAMPLING CLOCK

BACKGROUND OF THE INVENTION

1. Field of the Invention

The present invention relates to differential digital modulation and demodulation systems.

2. Description of the Prior Art

In differential modulation systems such as delta modulation systems and differential pulse code modulation systems a digital word is generated at the transmitting side of the system at the digital modulator as a function of the difference between a sampled value of an input analog signal and a tracking value which changes in quantized steps from sampling time to sampling time which is fundamentally formed by means of a summation of all preceding differential values. An integrator in a differential decoder is discharged or charged in a feedback path of the digital modulator as well as at the receiving side in a digital demodulator, depending upon the measure of the digital signal words. In modulation and demodulation systems operating as described above there is a problem: In the usual case of equidistant sampling times small differences between the sampled value and the tracking value are derived given relatively small sampling periods. That is, small encoding errors are derived even if the input analog signal exhibits a relatively steep curve. The high modulation clock rate, however, requires a correspondingly large transmission channel capacity, for message transmission, or a correspondingly large memory capacity, for message storage. If the sampling period is enlarged, the modulation clock rate is correspondingly lower, however, the tracking values cannot then follow a steep curve for the analog input signal with sufficient precision, and larger encoding errors are thus produced.

In an attempt to achieve an improved exploitation of the transmission channel capacity, a so-called asynchronous delta modulation system has been proposed in an article appearing in Electronics and Communications in Japan, Vol. 49, 1966 at pages 34–42. In the system disclosed in that article, a new digital signal word (a delta modulation bit) is formed in proper phase at such a point in time at which the analog signal has changed by a predetermined amount. Such an asynchronous modulation system, however, also requires an in-phase signal loading on the demodulator side, that is, a signal loading which retains the chronological distance of the delta modulation bits. This requirement excludes the insertion of the digital signal elements into a rigid grid which may deviate from the time frame of the asynchronous modulation system such as, for example, the pulse frame of a time-division multiplex transmission system for message transmission or the storage in a memory for message storage.

SUMMARY OF THE INVENTION

It is an object of the present invention to provide a differential digital modulation and demodulation system which makes use of an analog signal-dependent sampling clock in an economically feasible manner which allows the possibility of permitting the insertion of digital signal elements resulting from the use of such a sampling clock in a rigid grid.

The above object is inventively achieved in a differential digital modulation and demodulation system with an analog signal-dependent sampling clock wherein, for analog to digital conversion, the analog signal in addition to being supplied to a first digital modulator controlled by the sampling clock for converting the analog signal into the digital signal to be transmitted, is also supplied to a second predictably functioning digital modulator which generates a tracking error signal which acts as a control signal for the sampling clock generator for the first digital modulator. The clock frequency of the sampling clock generator for the first digital modulator is controlled by the tracking error signal such that the frequency is increased upon the occurrence of an increasing tracking error and is reduced upon the occurrence of a decreasing tracking error. The digital signal bits formed by the first digital modulator from the analog signal are respectively emitted in signal blocks together with a bit group indicating in encoded form the particular sampling clock frequency. For digital to analog conversion the digital signal bits are received in the signal block form by the digital demodulator with a bit group indicating the particular sampling clock frequency in encoded form and, after fanning of the digital signal bit and the bit group, the bit group, via a clock frequency memory, controls the clock generator of the digital demodulator to whose digital signal input the digital signal bits were supplied, for conversion into the analog signal.

The above system offers the advantage of generating amplitude and time data corresponding to the samples of an analog signal with a significant reduction in the virtual message information flow, which permits a reduced memory capacity in the case of message storage and reduced transmission capacity in the case of message transmission. In a further embodiment of the invention, the signal blocks are supplied to and taken from a transmission channel with a constant bit rate via a buffer memory.

The reduction in the virtual message information flow can be further reduced in another embodiment of the invention wherein only one signal block is emitted or received for an analog signal pause, the signal block containing the digital signal bits indicating the length of the analog pause together with a bit group signaling a pause instead of a sampling clock frequency.

BRIEF DESCRIPTION OF THE DRAWINGS

FIG. 1 is a schematic block diagram of a differential digital modulation system constructed in accordance with the principles of the present invention.

FIG. 2 is a schematic block diagram of a differential digital demodulation system constructed in accordance with the principles of the present invention.

FIG. 3 is a schematic representation of a signal block which my be employed in the differential digital modulation and demodulation systems shown in FIGS. 1 and 2.

DESCRIPTION OF THE PREFERRED EMBODIMENTS

An embodiment of a differential digital modulation system constructed in accordance with the principles of the present invention is shown in the block diagram of FIG. 1. This digital modulation system includes a digital modulator MO which converts an analog input signal occurring on an input line a into a digital signal occurring on a digital modulator output line d'. The digital modulator MO is connected to a sampling clock which supplies the digital modulator MO with clock pulses via a sampling clock line t'. The digital modulator MO in FIG. 1 may be a delta modulator such as a continuously variable slope delta modulator (CVSD modulator) which can be constructed in a known manner such as is described, for example, in the periodical Electronics dated Oct. 13, 1977 at pages 86–93 (FIG. 7) and German Offenlegungsschrift No. 28 15 790 (FIG. 1).

The digital modulator MO includes a comparator V' which is connected at an input side to the analog signal input line a and to the output line a' of an analog signal reconstruction filter RF'. The output of the comparator V' is connected to a quantizer Q' which is controlled by the sampling clock. The output of the quantizer Q' forms the output of the digital modulator MO and is also connected to a delta modulation decoder which can also be constructed in a known manner including a pulse sequence analyzer. The pulse sequence analyzer may consist of a shift register MR' which is connected to the output line d' as well as to the sampling clock line t' and having outputs connected to the inputs of logic identity gate G', the output of which is connected to a syllable filter SF' for integrating the output signals of the identity gate G' and thus forming a measure for the step width, that is, a measure for the size of the voltage difference to be added by the delta modulation decoder to the preceding signal value. The output of the syllable filter SF' is connected to control inputs of a bipolar current source circuit consisting of current sources $I_+$ and $I_-$ which is controlled by the output of the quantizer Q. The output of the bipolar current source is connected to the input of the analog reconstruction filter RF'. The quantizer Q' and the shift register MR' are controlled by the signals appearing on the sampling clock line t' received from the analog signal-dependent sampling clock described in greater detail below, the pulses being generated by a sampling clock generator TG'.

The differential digital modulator MO (and TM described below) need not necessarily be an adaptive delta modulator but may also be a linear delta modulator or a linear or adaptive delta pulse code modulator as well, those types of circuits being known to those skilled in the relevant technology.

The analog signal which is supplied to the digital modulator MO for conversion into a digital signal is also supplied to a second predictably functioning digital modulator TM which is shown in FIG. 1 also as an adaptive delta modulator. This CVSD modulator TM also comprises a comparator V2 having one input received from an analog signal reconstruction filter RF2 and an output connected to a clock-controlled quantizer Q2. The output of the quantizer Q2 is supplied to the analog reconstruction filter RF2. Just as in the digital modulator MO, the second digital modulator TM has a pulse sequency analyzer consisting of a shift register MR2 and an identity gate G2. The shift register MR2 is connected to the output of the quantizer Q2 and is supplied with clock pulses on a clock line t2 from a clock generator TG2, which also is connected to the quantizer Q2. The output of the syllable filter SF2, which has a filter time constant in the range of approximately 2 milliseconds, as does the syllable filter SF', is connected to a multiplier M2, which may be, for example, a mixer, for multiplying the analog input signal with the output of the syllable filter SF2, with the product being supplied to the comparator V2.

A control signal for the sampling clock generator TG' associated with the first digital modulator MO is formed from the tracking error signal occurring on the output line f of the comparator V2 of the second digital modulator TM, by means of which the clock frequency of the sampling clock generator TG' is increased given an increasing tracking error and is reduced given a decreasing error. To this end, the tracking error signal is squared in the multiplier P2, is rectified, and is subsequently filtred in a low pass filter TP and is supplied to an analog/digital converter A/D via a low pass filter output line s.

After conversion in the analog/digital converter A/D, the signal is first supplied to a clock frequency memory TS' and is then converted back to an analog signal in a subsequent digital to analog converter D/A. The clock frequency memory TS' is controlled by a signal appearing on a block clock line T' which is generated by a clock rate divider T from the signal received from the clock generator TG'. The reduction ratio which occurs by the operation of the clock rate divider T is preferably selected such that the block clock frequency of the signal appearing on the line T' corresponds to the low-end frequency of the analog signal to be converted. For voice, this low-end frequency lies at approximately 50 Hz, so that the period of the signal appearing on the block clock line T' is in the range of approximately 20 milliseconds and thus, given a mean sampling clock period of, for example, approximately 80 microseconds corresponding to a digital signal bit rate of 12.5 kbit/s, requiring a clock reduction or scaling ratio of approximately 1:256.

At periodic intervals, for example every 20 milliseconds in the above example, the clock frequency memory TS' accepts the instantaneous value of the control signal (in digital representation) which is present on the line s and charges the sampling clock generator TG' associated with the first digital modulator MO with that signal for the subsequent block clock period (20 milliseconds in the example) so that the sampling clock frequency of the sampling clock generator TG' is increased in comparison to the sampling clock frequency which was effective in the preceding 20 milliseconds by the increase of the tracking error occurring in the second digital modulator TM derived in the preceding 20 milliseconds. Similarly, a reduction in the sampling clock frequency generated by the sampling clock generator TG' will be effected if the tracking error is reduced.

In order to insure that the sampling clock frequency for the first digital modulator MO corresponds to the portion of the analog signal to be converted into digital form, the analog signal is supplied to the first digital modulator MO via a time delay element $\tau 1$ which has a delay time corresponding to the period of the signal on the line T', such as approximately 20 seconds, which bridges the operating time which has elapsed during the formation of the associated clock control signal. The time delay element $\tau 1$ can be formed by means of a known bucket-brigade circuit or by means of an analog to digital converter, a first in, first out (FIFO) memory, and a digital to analog converter connected in series.

In the embodiment shown in FIG. 1, the control signal occurring on the line s also directly controls the sampling clock generator TG2 for the second digital modulator TM, however, the sampling clock generator TG2 may also function with a constant, relatively high clock rate in which case a non-linear signal conversion can also be undertaken in conjunction with the analog to digital conversion of the signal appearing on the control line s in order to form the clock signal appearing on the line t', with the converted signal again being stored in the clock frequency memory TS' and being supplied to the clock generator TG' associated with the first digital modulator MO after digital to analog conversion. A linear control signal conversion can be undertaken for the formation of an optimum clock control signal in connection with the analog digital conversion of the control signal even in a clock control in the closed-loop formation of FIG. 1.

Because the sampling clock rate of the digital modulator MO is dependent upon the analog signal which is used to control the sampling clock in the modulator MO, it is necessary that information, identifying the clock frequency associated with the particular segment of the analog signal to be transmitted, is transmitted along with the digital form of the analog signal. To this end the sampling frequency information along with the digital signal bits representing the analog signal in the associated time period are transmitted and received in the form of signal blocks which contain a bit group indicating the respective sampling clock frequency in encoded form.

As is shown in FIG. 1, such signal blocks are generated by means of a signal block register BS, to which a serial to parallel converter S/P which receives a series of digital signals from the line d', and the output of the analog to digital converter A/D immediately preceding the clock frequency memory TS', are connected through a switching means U'. The switching means is controlled by a signal on a pause control line p generated by a pause encoder PC, which has a pair of outputs which are also connected to the switching means U'. The pause encoder detects an analog signal pause by means of a threshold circuit on the basis of the fact that the output signal of the syllable filter SF' approaches zero at such an analog signal pause, and determines the pause duration by means of a clock-controlled counter. The pause encoder PC switches the switching means U' and forwards a bit group indicating a pause and a bit combination indicating the pause duration in encoded form upon the occurrence of each such pause. Because the pause signal block is shorter than the pause itself, transmission capacity and/or memory capacity for devices which may be post-connected to the switching means U' can be significantly decreased. The pause encoding circuit PC may be constructed, for example, in accordance with the teachings of U.S. Pat. No. 4,053,712.

The outputs of the switching means U' are connected to a signal block register BS for supplying digital data in parallel thereto for forming a signal block.

Such a signal block is shown in FIG. 3 which comprises a bit group of, for example, three bits A, B and C indicating the respective sampling clock frequency in encoded form and further comprises a number of digital signal bits which are formed by the first digital modulator MO from the analog signal. The number of such digital signal bits may, as is shown in FIG. 3, be fixed at a constant number such as 253, however, the blocks may instead contain a plurality of digital signal bits in addition to the bit group indicating the sampling clock rate which number is dependent upon the sampling clock rate. The data comprising the signal block is supplied to the signal block register BS at periods during which access to the signal block register BS is permitted by the scaled block pulse signal occurring on the line T'. If the signal block contains a relatively large number of digital signal bits, such as 253, the signal bits can be supplied to the block register BS in serial form, without a preceding serial to parallel conversion.

The signal blocks appear as a serial output of the signal block register BS, controlled by the signal occurring on the line t' and can be supplied to a transmission means for message transmission or to a memory for message storage (not shown in FIG. 1). For message transmission, the signal blocks can be supplied via a buffer memory P' to a transmission channel L with a constant bit rate. The buffer memory P' may have a memory capacity of, for example, 8 signal blocks, or $8 \times 256$ bits in the example according to the signal block shown in FIG. 3, in order to be able to further transmit the signal blocks supplied in the analog signal-dependent block grid corresponding to the signal occurring on the line T' without information falsification with said constant bit rate. The required buffer memory capacity can be maintained relatively small by only one signal block being emitted for an analog signal pause, the signal block containing the digital signal bits in encoded form indicating the pause length together with a bit group signalizing a pause instead of a sampling clock frequency. This is achieved by the encoding circuit PC described above. In order to achieve greater security for the pause detection, the output of the syllable filter SF2 is supplied to the pause encoding circuit PC via a second time delay element $\tau 2$. When the switchover of the switching means U' occurs, controlled by a signal on the line p from the pause encoder PC, the outputs of the pause encoder PC are directly supplied to the block signal register BS for formation of the shorter signal block.

The manner of digital to analog conversion undertaken during the course of differential digital modulation in accordance with the principles of the present invention is shown in FIG. 2. The signal blocks, of the type shown in FIG. 3, are received over the transmission channel L by a buffer memory P''. If the message was instead stored in a message memory such as, for example, in the case of speech synthesis, the signal blocks could be taken directly from such a memory instead of the buffer memory P''. The signal blocks are serially supplied to a second signal block register BE when access to the signal block register BE is permitted by a pulse signal occurring on a line t''. The signals are separated into signals corresponding to the digital signal bits (1, ... 252, 253 in FIG. 3) and the bit group (A, B, C in FIG. 3). The bit group is supplied on a multiple output line to a clock frequency memory TS'', the output being controlled by apulse appearing on a block clock line T''. The output of the clock frequency generator TS'' is supplied through a digital to analog converter D/A to a clock generator TG'' for operating a digital demodulator DEM. The digital demodulator DEM can be constructed in the same manner as the delta modulation decoder which is contained in the first digital modulator MO in FIG. 1 between the output line d' and the line a'.

The other output of the signal block register supplies the digital signal bits of the signal block on a multiple output line in parallel form to a parallel/serial converter P/S which in turn supplies the signal bits in serial form to a switching means U'''. The digital signal bits are also supplied along a multiple line to a pause decoder PD, and the bit group is supplied from the other output of the signal block register along the multiple output line to a gate GT for controlling the pause decoder PD. The gate may be of any suitable type, such as an AND gate in the case of a ... 111 ... bit group such that when a bit group indicating a pause is recognized the pause decoder is enabled and supplies a signal to the switching means U" for connecting the switching means to an Idle generator which continuously emits a bit sequence ... 101010 ... for the duration of the pause. The pause duration is determined in the pause decoding circuit PD by means of a clock-controlled backward counter which is present by the bit combination supplied by the multiple line. The output of the switching means U" is supplied to the digital demodulator DEM over a line d". For the period during which the Idle generator is connected to the digital demodulator DEM, the demodulator emits an analog output of zero at line a". When the switching means U" is connected to the output of the parallel/serial converter P/S, the digital demodulator emits a changing analog output at line a" corresponding to the digital information signal supplied thereto.

The signal occurring on the line T" for controlling the output of the signal block register BE is generated from the clock generator TG" through a clock rate divider T, of the type employed in the transmitting side shown in FIG. 1.

Although modifications and changes may be suggested by those skilled in the art it is the intention of the inventor to embody within the patent warranted hereon all changes and modifications as reasonably and properly come within the scope of his contribution to the art.

I claim as my invention:

1. A differential digital modulation and demodulation system comprising:
    a means for analog to digital conversion of an analog input signal including
        a first digital modulator to which said analog input signal is supplied for converting said analog signal into a digital signal to be transmitted,
        a sampling clock for controlling said first digital modulator, said sampling clock having and being controlled by a sampling clock generator,
        a second digital modulator to which said analog input signal is supplied for generating a tracking error signal,
        a means for generating a control signal for said sampling clock generator from said tracking error signal of said second digital modulator, said control signal increasing the frequency of said sampling clock generator upon an increasing tracking error signal and reducing the frequency of said sampling clock generator upon a decreasing tracking error signal;
    a means connected to an output of said first digital modulator and to said sampling clock for generating a signal block containing a plurality of digital signal bits corresponding to said analog signal and a bit group identifying the sampling clock frequency employed for generating said digital signal bits in encoded form; and
    a means for digital to analog conversion of said signal block including
        a means for separating said signal block into components consisting of said digital signal bits and said bit group,
        a digital demodulator for converting said digital signal bits into an analog signal corresponding to said analog input signal,
        a clock generator for controlling said digital modulator,
        a clock frequency memory for receiving said bit group and for controlling said clock generator such that said clock generator supplies a frequency for controlling said digital demodulator which corresponds to the frequency in said means for analog to digital conversion which was employed for generating said digital signal bits.

2. The system of claim 1 further comprising a transmission channel interconnected between said means for analog to digital conversion and said means for digital to analog conversion to which said signal blocks are supplied at a constant bit rate, and a first buffer memory interconnected between said means for analog to digital conversion and said transmission channel and a second buffer memory interconnected between said transmission channel and said means for digital to analog conversion.

3. The system of claim 1 wherein said plurality of digital signal bits in said signal block is a predetermined constant number.

4. The system of claim 1 wherein said plurality of signal bits in said signal block is dependent upon the frequency of said sampling clock employed for generating said digital bits.

5. The system of claim 1 wherein said analog input signal contains at least one analog signal pause during which pause said analog signal is substantially zero, said system further comprising a means for generating one signal block representing the entire analog signal pause, said one signal block containing a plurality of digital signal bits indicating the length of said pause and a bit group identifying the presence of said analog signal pause.

6. The system of claim 1 further comprising a means for squaring and rectifying said control signal and a low pass filter interconnected between said means for squaring and rectifying said control signal and said sampling clock generator.

7. The system of claim 6 further comprising a second clock frequency memory interconnected between said low pass filter and said sampling clock generator and a block clock means for controlling the input to said second clock frequency memory such that the output of said low pass filter is admitted to said second clock frequency memory only during selected periods.

8. The system of claim 7 wherein said block clock means controls the admission of the output of said low pass filter to said second clock frequency memory at periodic intervals having a frequency approximately equal to a low-end frequency of said analog input signal.

9. The system of claim 6 wherein said second digital modulator is controlled by a second sampling clock generator and wherein the frequency of said second clock generator is controlled by said control signal from said low pass filter.

10. The system of claim 6 wherein said second digital modulator is controlled by a second sampling clock generator, said second sampling clock generator providing a constant high clock frequency.

11. The system of claim 7 wherein said clock frequency memory further undertakes a conversion of said control signal.

12. The system of claim 1 further comprising a time delay element preceding said first digital modulator, said time delay element having a time delay corresponding to the time required for formation of said control signal.

13. The system of claim 1 wherein said second digital modulator is a delta modulator.

14. The system of claim 13 wherein said second digital modulator is an adaptive delta modulator.

15. The system of claim 1 wherein said first digital modulator is a delta modulator.

16. The system of claim 15 wherein said first digital modulator is an adaptive delta modulator.

17. The system of claim 1 wherein said first digital modulator is a delta pulse code modulator.

18. The system of claim 17 wherein said first digital modulator is an adaptive delta pulse code modulator.

* * * * *